(12) United States Patent
Wu et al.

(10) Patent No.: US 8,339,214 B2
(45) Date of Patent: Dec. 25, 2012

(54) EQUALIZATION SYSTEM

(75) Inventors: Zhaolei Wu, Chengdu (CN); Guosheng Wu, Chengdu (CN)

(73) Assignee: IPGoal Microelectronics (SiChuan) Co., Ltd., Chengdu, Sichuan Province (CN)

( * ) Notice: Subject to any disclaimer, the term of this patent is extended or adjusted under 35 U.S.C. 154(b) by 18 days.

(21) Appl. No.: 13/151,754

(22) Filed: Jun. 2, 2011

(65) Prior Publication Data
US 2011/0299584 A1 Dec. 8, 2011

(30) Foreign Application Priority Data

Jun. 2, 2010 (CN) .......................... 2010 1 0190368

(51) Int. Cl.
*H03H 5/00* (2006.01)
(52) U.S. Cl. ..................................................... 333/28 R
(58) Field of Classification Search ................ 333/28 R, 333/18; 375/229
See application file for complete search history.

(56) References Cited

U.S. PATENT DOCUMENTS
7,047,556 B2 * 5/2006 Cole et al. ..................... 725/149

* cited by examiner

*Primary Examiner* — Stephen Jones

(57) ABSTRACT

An equalization system includes an adjustable equalization unit, a common-mode feedback unit connected with the equalization unit, a current balance driving unit connected with the feedback and equalization units, a first high-pass filter unit connected with the equalization unit, a second high-pass filter unit connected with the driving unit, a first low-pass filter unit connected with the equalization unit, a second low-pass filter unit connected with the driving unit, a first energy detection unit connected with two high-pass filter units, a second energy detection unit connected with two low-pass filter units, a first analog-to-digital converter unit connected with the first energy detection unit, a second analog-to-digital converter unit connected with the second energy detection unit and a state decision unit connected with two analog-to-digital converter units outputs a control signal for adjusting the equalization unit. It improves the signal quality of the receiver of the high-speed signal transmission system.

20 Claims, 1 Drawing Sheet

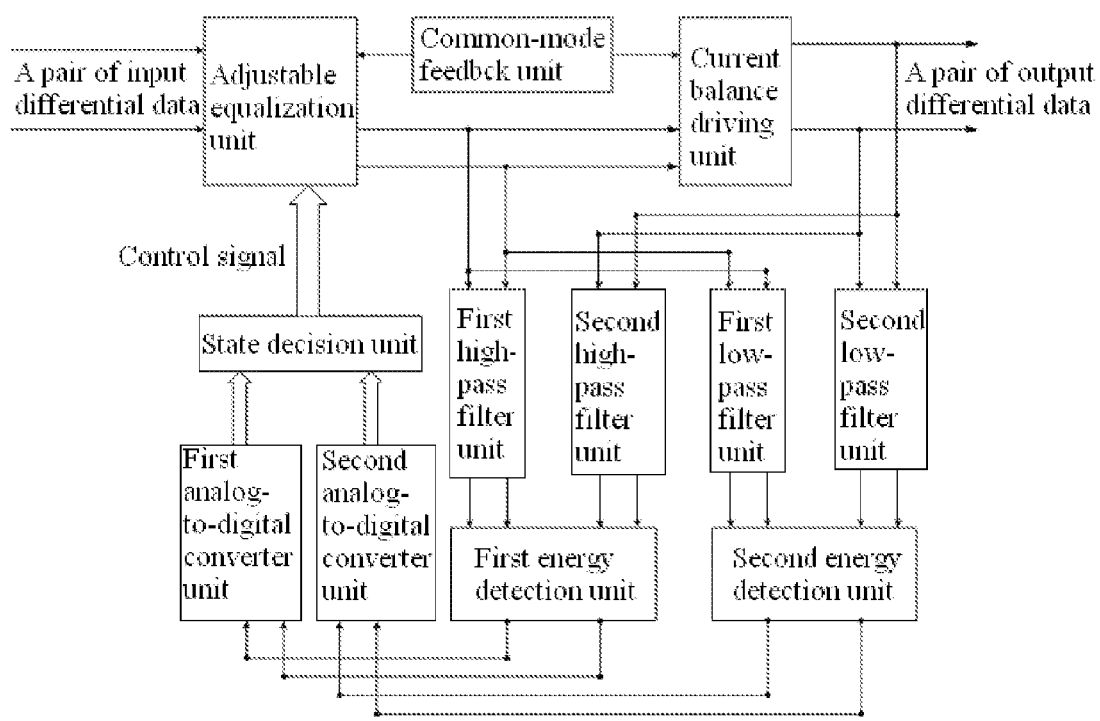

EQUALIZATION SYSTEM

BACKGROUND OF THE PRESENT INVENTION

1. Field of Invention

The present invention relates to an equalization system, and more particularly to an adaptive equalization system for the receiver of the high-speed signal transmission system.

2. Description of Related Arts

In the high-speed serial signal transmission system, after the signal sent by the sender passes through various signal channels, the signal quality is subjected to different degrees of wear and tear affected by the transmission characteristics of the signal channels, thereby increasing the difficulty of receiving the signal by the receiver.

To compensate the effect of the signal channel on the transmission signal, an equalizer is needed in the receiver. Owing to different attenuation characteristics of the signal channels, it is necessary to provide an equalization system which is capable of automatically adjusting the frequency characteristics.

SUMMARY OF THE PRESENT INVENTION

An object of the present invention is to provide an equalization system for the receiver of the high-speed signal transmission system, which is capable of effectively improving the signal quality of the receiver of the high-speed signal transmission system.

Accordingly, in order to accomplish the above object, the present invention provides an equalization system, comprising:

an adjustable equalization unit, a common-mode feedback unit connected with the adjustable equalization unit, a current balance driving unit connected with the common-mode feedback unit and the adjustable equalization unit, a first high-pass filter unit connected with the adjustable equalization unit, a second high-pass filter unit connected with the current balance driving unit, a first low-pass filter unit connected with the adjustable equalization unit, a second low-pass filter unit connected with the current balance driving unit, a first energy detection unit connected with the first and second high-pass filter units, a second energy detection unit connected with the first and second low-pass filter units, a first analog-to-digital converter unit connected with the first energy detection unit, a second analog-to-digital converter unit connected with the second energy detection unit and a state decision unit connected with the first and second analog-to-digital converter units, wherein the state decision unit outputs a control signal for adjusting the adjustable equalization unit.

Compared with the prior art, in the equalization system of the present invention, the direct current (DC) voltage of the output signal of the adjustable equalization unit and the direct current (DC) voltage of the output signal of the current balance driving unit are same by the common-mode feedback unit, thereby effectively avoiding the low-frequency energy error caused by the common-mode mismatch. The reference signal source with the controllable and perfect signal quality can be obtained by the current balance driving unit. The quality information of the adjusted signal can be effectively obtained by the high and low frequency energy detection units, thereby avoiding the wrong detection caused by the low or high frequency gain overcompensation of the equalization system. Therefore, the equalization system effectively improves the signal quality of the receiver of the high-speed signal transmission system.

These and other objectives, features, and advantages of the present invention will become apparent from the following detailed description, the accompanying drawings, and the appended claims.

BRIEF DESCRIPTION OF THE DRAWINGS

The drawing is a structural graph of an equalization system according to a preferred embodiment of the present invention.

DETAILED DESCRIPTION OF THE PREFERRED EMBODIMENT

Referring to the drawing, an equalization system according to a preferred embodiment of the present invention is illustrated, wherein the equalization system comprises an adjustable equalization unit, a common-mode feedback unit connected with the adjustable equalization unit, a current balance driving unit connected with the common-mode feedback unit and the adjustable equalization unit, a first high-pass filter unit, a second high-pass filter unit, a first low-pass filter unit, a second low-pass filter unit, a first energy detection unit, a second energy detection unit, a first analog-to-digital converter unit, a second analog-to-digital converter unit and a state decision unit.

Two input ends of the adjustable equalization unit are adapted for receiving a pair of input differential data, two output ends thereof are respectively connected with two input ends of the current balance driving unit, two output ends of the current balance driving unit respectively output a pair of output differential data. The two output ends of the adjustable equalization unit are respectively connected with two input ends of the first high-pass filter unit and are respectively connected with two input ends of the first low-pass filter unit. The two output ends of the current balance drive unit are respectively connected with two input ends of the second high-pass filter unit and are respectively connected with two input ends of the second low-pass filter unit. Two output ends of the first high-pass filter unit and two output ends of the second high-pass filter unit are connected with the input end of the first energy detection unit. Two output ends of the first low-pass filter unit and two output ends of the second low-pass filter unit are connected with the input end of the second energy detection unit. The output end of the first energy detection unit is connected with the input end of the first analog-to-digital converter unit. The output end of the second energy detection unit is connected with the input end of the second analog-to-digital converter unit. The output end of the first analog-to-digital converter unit and the output end of the second analog-to-digital converter unit are connected with the input end of the state decision unit. The output end of the state decision unit is connected with the adjustable equalization unit.

The adjustable equalization unit is a filter with the adjustable bandwidth. It is capable of balancing the high and low frequency components of the input differential data signals by adjusting the zero-pole, thereby ensuring the quality of the output signals.

For the input data having the amplitude larger than the predetermined amplitude, the current balance driving unit can send the dataflow signal with the fixed voltage amplitude and balanced rising and falling edges.

The common-mode feedback unit can ensure that the DC voltage of the output signal of the adjustable equalization unit and the DC voltage of the output signal of the current balance driving unit are same, so as to reduce the detection deviation caused by the DC component deviation during the energy detection.

The two low-pass filter units are adapted for obtaining the low-frequency components of the input differential data signals. The two high-pass filter units are adapted for obtaining the high-frequency components of the input differential data signals.

The two energy detection units are adapted for detecting the energy difference of the input signals and transforming the energy difference into the corresponding voltage signal.

The two digital-to-digital converter units transform the input analog voltage signal into the digital signal. According to the digital signal, the state decision unit determines the operating state and sends the control signal related to the state to the adjustable equalization unit.

The operating principle of the equalization system of the present invention is described as follows. Firstly, the common-mode feedback unit ensures that the DC voltage of the output signal of the adjustable equalization unit and the DC voltage of the output signal of the current balance driving unit are same, and then a pair of external input differential data signals are randomly adjusted by the adjustable equalization unit, namely, make the high and low frequency equalization treatment of the fixed frequency characteristics to the pair of external input differential data signals, the current balance driving unit transforms the signals output by the adjustable equalization unit into the differential signal with the fixed amplitude and balanced rising and falling edges, and take the differential signal as the standard of judging the signal quality.

The output signals of the adjustable equalization unit are sent into the first energy detection unit by the first high-pass filter unit and those of the current balance driving unit are sent into the first energy detection unit by the second high-pass filter unit. The first energy detection unit can adjust the high-frequency energy of the output signals of the adjustable equalization unit and the high-frequency energy of the output signals of the current balance driving unit, and send the difference between the high-frequency energy of the output signals of the adjustable equalization unit and the high-frequency energy of the output signals of the current balance driving unit to the first analog-to-digital converter unit, wherein the difference is the analog differential signal.

The output signals of the adjustable equalization unit are sent into the second energy detection unit by the first low-pass filter unit and those of the current balance driving unit are sent into the second energy detection unit by the second low-pass filter unit. The second energy detection unit can adjust the low-frequency energy of the output signals of the adjustable equalization unit and the low-frequency energy of the output signals of the current balance driving unit, and send the difference between the low-frequency energy of the output signals of the adjustable equalization unit and the low-frequency energy of the output signals of the current balance driving unit to the second analog-to-digital converter unit, wherein the difference is the analog differential signal.

The output differential signals of the first and second energy detection units are transformed to the digital signals by the first and second analog-to-digital converter units, respectively. The state decision unit determines the operating state of the equalization system by judging the codes of the digital signals and sends the corresponding control signal to the adjustable equalization unit. The control signal can adjust the zero-pole of the adjustable equalization unit, and balance the high and low frequency components of the input signal such that the components can be close to the output signal of the current balance driving unit. When the outputs of the adjustable equalization unit are closely equal to the output high and low frequency energies of the current balance driving unit, the signal quality of the current equalization driving unit is the best, namely, the signal can be used for the input signal of the clock data recovery, thereby recovering the clocks and data.

The DC voltage of the output signal of the adjustable equalization unit and the DC voltage of the output signal of the current balance driving unit are same by the common-mode feedback unit, thereby effectively avoiding the low-frequency energy error caused by the common-mode mismatch. The reference signal source with the controllable and perfect signal quality can be obtained by the current balance driving unit. The quality information of the adjusted signal can be effectively obtained by the high and low frequency energy detection units, thereby avoiding the wrong detection caused by the low or high frequency gain overcompensation of the equalization system. Therefore, the equalization system effectively improves the signal quality of the receiver of the high-speed signal transmission system.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:
1. An equalization system, comprising:
an adjustable equalization unit, a common-mode feedback unit connected with said adjustable equalization unit, a current balance driving unit connected with said common-mode feedback unit and said adjustable equalization unit, a first high-pass filter unit connected with said adjustable equalization unit, a second high-pass filter unit connected with said current balance driving unit, a first low-pass filter unit connected with said adjustable equalization unit, a second low-pass filter unit connected with said current balance driving unit, a first energy detection unit connected with said first and second high-pass filter units, a second energy detection unit connected with said first and second low-pass filter units, a first analog-to-digital converter unit connected with said first energy detection unit, a second analog-to-digital converter unit connected with said second energy detection unit and a state decision unit connected with said first and second analog-to-digital converter units, wherein said state decision unit outputs a control signal for adjusting said adjustable equalization unit.

2. The equalization system, as recited in claim 1, wherein said adjustable equalization unit is a filter with an adjustable bandwidth and can balance high and low frequency components of two input differential data by adjusting a zero-pole based on said control signal.

3. The equalization system, as recited in claim 1, wherein said current balance driving unit outputs a dataflow signal with fixed voltage amplitude and balanced rising and falling edges.

4. The equalization system, as recited in claim 1, wherein a direct current voltage of an output signal of said adjustable equalization unit and a direct current voltage of an output signal of said current balance driving unit are same.

5. The equalization system, as recited in claim 1, wherein said first and second energy detection units are adapted for detecting an energy difference of input signals thereof and transforming said energy difference into a corresponding voltage signal.

6. The equalization system, as recited in claim 1, wherein said first and second analog-to-digital converter units transform an input analog voltage signal into a digital signal, wherein said state decision unit determines an operating state based on said digital signal and sends said control signal related to said operating state to said adjustable equalization unit.

7. The equalization system, as recited in claim 1, wherein two input ends of said adjustable equalization unit are adapted for respectively receiving a pair of input differential data, two output ends of said adjustable equalization unit are respectively connected with two input ends of said current balance driving unit, two output ends of said current balance driving unit respectively outputs a pair of output differential data.

8. The equalization system, as recited in claim 7, wherein said adjustable equalization unit is a filter with an adjustable bandwidth and can balance high and low frequency components of said two input differential data by adjusting a zero-pole based on said control signal.

9. The equalization system, as recited in claim 7, wherein each of said pair of output differential data is a dataflow signal with fixed voltage amplitude and balanced rising and falling edges.

10. The equalization system, as recited in claim 7, wherein said two output ends of said adjustable equalization unit are respectively connected with two input ends of said first high-pass filer unit and are respectively connected with two input ends of said first low-pass filer unit, said two output ends of said current balance driving unit are respectively connected with two input ends of said second high-pass filer unit and are respectively connected with two input ends of said second low-pass filer unit.

11. The equalization system, as recited in claim 10, wherein each of said pair of output differential data is a dataflow signal with fixed voltage amplitude and balanced rising and falling edges.

12. The equalization system, as recited in claim 10, wherein a direct current voltage of an output signal of said adjustable equalization unit and a direct current voltage of an output signal of said current balance driving unit are same.

13. The equalization system, as recited in claim 10, wherein said first and second analog-to-digital converter units transform an input analog voltage signal into a digital signal, wherein said state decision unit determines an operating state based on said digital signal and sends said control signal related to said operating state to said adjustable equalization unit.

14. The equalization system, as recited in claim 10, wherein said adjustable equalization unit is a filter with an adjustable bandwidth and can balance high and low frequency components of said two input differential data by adjusting a zero-pole based on said control signal.

15. The equalization system, as recited in claim 14, wherein each of said pair of output differential data is a dataflow signal with fixed voltage amplitude and balanced rising and falling edges.

16. The equalization system, as recited in claim 15, wherein a direct current voltage of an output signal of said adjustable equalization unit and a direct current voltage of an output signal of said current balance driving unit are same.

17. The equalization system, as recited in claim 16, wherein said first and second energy detection units are adapted for detecting an energy difference of input signals thereof and transforming said energy difference into a corresponding voltage signal.

18. The equalization system, as recited in claim 16, wherein said first and second high-pass filter units and said first and second low-pass filter units are adapted for obtaining low and high frequency components of two input differential data.

19. The equalization system, as recited in claim 18, wherein said first and second energy detection units are adapted for detecting an energy difference of input signals thereof and transforming said energy difference into a corresponding voltage signal.

20. The equalization system, as recited in claim 19, wherein said first and second analog-to-digital converter units transform an input analog voltage signal into a digital signal, wherein said state decision unit determines an operating state based on said digital signal and sends said control signal related to said operating state to said adjustable equalization unit.

\* \* \* \* \*